UNITED STATES PATENT OFFICE.

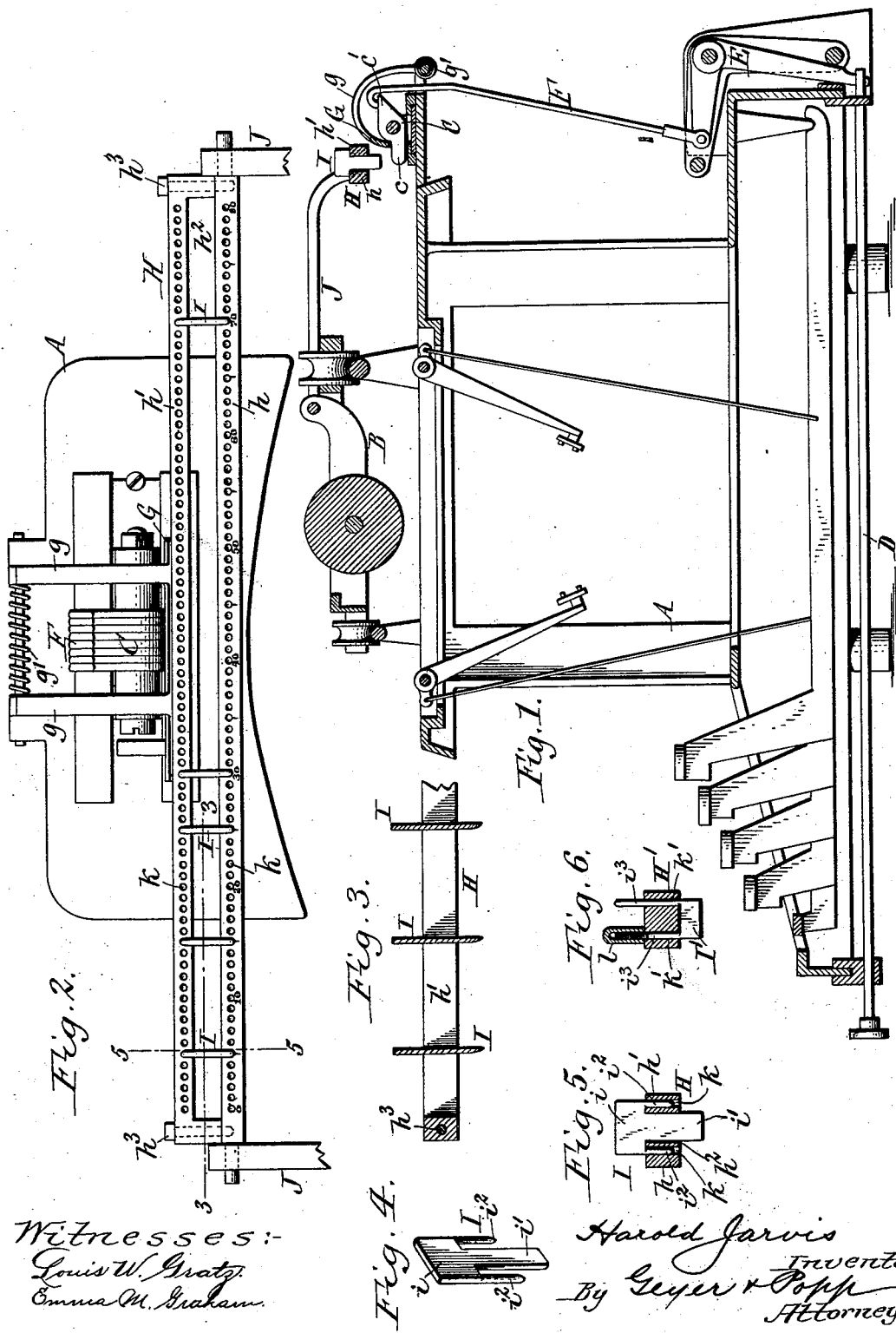

HAROLD JARVIS, OF BUFFALO, NEW YORK, ASSIGNOR TO JARVIS TYPE-WRITER & TABULATOR COMPANY, OF BUFFALO, NEW YORK.

TYPE-WRITING MACHINE.

SPECIFICATION forming part of Letters Patent No. 714,186, dated November 25, 1902.

Application filed March 21, 1902. Serial No. 99,243. (No model.)

*To all whom it may concern:*

Be it known that I, HAROLD JARVIS, a citizen of the United States, residing at Buffalo, in the county of Erie and State of New York, have invented new and useful Improvements in Type-Writing Machines, of which the following is a specification.

This invention relates to a tabulating mechanism for type-writing machines, and has the object to provide an improved carriage stop or tappet for such mechanism which can be quickly and conveniently adjusted as required.

In the accompanying drawings, Figure 1 is a sectional elevation of a type-writing machine having a tabulating mechanism provided with my improved stop, only such parts of the machine being shown as are necessary for a clear understanding of the invention. Fig. 2 is a fragmentary top plan view, on an enlarged scale, of the tabulating mechanism. Fig. 3 is a fragmentary vertical section in line 3 3, Fig. 2. Fig. 4 is a perspective view of the stop shown in the preceding figures. Fig. 5 is a cross-section in line 5 5, Fig. 2. Fig. 6 is a cross-section similar to Fig. 5, showing another form of stop embodying my invention.

Like letters of reference refer to like parts in the several figures.

A represents the frame of the machine, and B the platen-carriage, which may be actuated by keys and a feed mechanism of any suitable or well-known construction.

C represents the dogs or detents which form part of the variable spacing or tabulating mechanism and by which the carriage may be arrested at different distances in advance of the printing-point. A plurality of these dogs are pivoted side by side on the upper rear part of the frame, so that they can be turned in a vertical plane at right angles to the movement of the carriage. Each of these dogs is turned to bring the nose $c$ at its front end into an operative position by means of a longitudinal shifting-rod D, arranged in the lower part of the machine, an elbow-lever E, having one arm connected with the shifting-rod, and a connecting-rod F, pivoted at its lower end to the other arm of the elbow-lever and having its hook-shaped upper end engaged over the tail $c'$ of the dog. The several dogs are depressed into their inoperative position by a presser-bar G, which is pivoted by means of arms $g$ to the rear part of the frame and held yieldingly against the upper side of the noses of the dogs by a spring $g'$. These dogs and their operating mechanism form no part of this invention and are fully described in an application for patent filed by M. H. Blakeslee and myself February 1, 1901, Serial No. 45,625.

H represents a stop-rack, which carries stops or tappets I, by which the carriage is arrested when the tabulating mechanism is in operation. As shown in Figs. 1 and 2, this rack is arranged transversely over the dogs of the tabulating mechanism and is supported by arms or brackets J, projecting rearwardly from the platen-carriage. The stop-rack consists of two parallel members or bars $h\ h'$, which are separated to form an intervening space or slot $h^2$ between the same, and the bars constituting this stop-rack are preferably made separate and connected at their ends by screws $h^3$ or otherwise. Each of these bars is provided with a longitudinal row of vertical openings or sockets $k$, both of which rows are arranged at a distance from its edges, and the several openings are separated the distance of a letter-space, or, in other words, are spaced like the teeth of the usual escapement-rack which controls the platen-carriage. The opposing openings of the two bars are arranged in alinement with each other transversely of the bars, forming equidistant pairs of openings extending in a series nearly throughout the length of the stop-rack.

As shown in Figs. 4 and 5, each stop or tappet I consists of an upper wide part or head $i$, a contracted lower part or stem $i'$, depending from the central portion of the head and made of greater length than the thickness of the stop-rack H, and two holding-pins $i^2\ i^2$, projecting downwardly from the ends of the head on opposite sides of the stem. In applying the stop to the rack H its stem is placed between the rack-bars $h\ h'$ from the upper side thereof, with its pins inserted in a pair of openings of the rack, and the stop is then pushed down until its head bears against the upper side of the rack. In this position of the stop its stem extends below the stop-rack and in moving forward with the carriage engages the elevated nose c of whichever dog C has been turned into its operative position, thereby arresting the forward movement of the carriage while the ordinary step-by-step feed mechanism is out of action in a well-known manner.

By shifting the stops from one pair of openings in the rack-bars to another the carriage may be arrested at the desired points in tabulating. One of the bars of the rack preferably has some of its openings numbered to correspond with the usual scale to enable the operator to readily adjust the stops. This means of adjustably supporting the stops of the rack, while simple in construction, holds the stops securely in place against turning or twisting by its impact against a dog of the tabulator mechanism and also permits the stops to be readily shifted from one place to another on the rack.

Instead of attaching the stops to the rack from the upper side thereof they may be applied from the under side, as shown in Fig. 6. In this construction the rack consists of a single bar H', having two longitudinal rows of vertical openings $k'$, which are arranged in pairs transversely of the rack. The stop in this case consists of a lug or cross-bar I' and two separated parallel holding-pins $i^3$, extending upward therefrom. In applying this stop its pins are inserted in a pair of openings of the rack from the lower side of the latter until the cross-bar of the stop bears against the under side of the rack. This form of stop may be retained in place on the bar by friction alone; but I prefer to secure it positively by mechanical means—for instance, a screw-nut $l$, applied to the screw-threaded upper end of one of its pins and bearing against the upper side of the rack, as shown in Fig. 6.

I claim as my invention—

1. An adjustable stop device for the tabulating mechanism of a type-writing machine, consisting of a rack having two longitudinal rows of openings both located at a distance from its edges with the openings arranged in pairs crosswise of the rack, and a stop or tappet having two pins which are constructed to fit into a pair of said openings, substantially as set forth.

2. An adjustable stop device for the tabulating mechanism of a type-writing machine, consisting of two parallel bars forming a rack and separated by an intervening space or slot, each bar having a longitudinal row of vertical openings, and a stop or tappet consisting of a head resting upon said bars, a stem projecting from the central part of said head and arranged between said bars, and two holding-pins depending from said head on opposite sides of said stem and seated in a pair of openings in said bars, substantially as set forth.

3. A stop or tappet for the tabulating mechanism of a type-writing machine, consisting of a head, a stem extending downwardly from said head, and holding-pins depending from said head on opposite sides of said stem, substantially as set forth.

Witness my hand this 13th day of March, 1902.

HAROLD JARVIS.

Witnesses:
 THEO. L. POPP,
 CARL F. GEYER.